United States Patent [19]

Wahlstrom

[11] Patent Number: 4,460,301
[45] Date of Patent: Jul. 17, 1984

[54] RIVET NAIL

[75] Inventor: Olle Wahlstrom, Katrineholm, Sweden

[73] Assignee: Lars Billing, Helsingborg, Sweden

[21] Appl. No.: 348,020

[22] Filed: Feb. 11, 1982

Related U.S. Application Data

[63] Continuation of Ser. No. 887,722, Mar. 17, 1978, abandoned.

[30] Foreign Application Priority Data

Mar. 21, 1977 [SE] Sweden ............................. 77031672

[51] Int. Cl.$^3$ ............................................ F16B 15/04
[52] U.S. Cl. ................................... 411/449; 411/501
[58] Field of Search ............... 411/446, 447, 448, 449, 411/450, 500, 501

[56] References Cited

U.S. PATENT DOCUMENTS

| | | | |
|---|---|---|---|
| 831,303 | 9/1906 | Scott | 411/448 |
| 2,356,376 | 8/1944 | Brown, Jr. | |
| 2,376,936 | 5/1945 | Pfeffer | 411/449 |
| 2,502,267 | 3/1950 | McPherson | 411/22 |
| 2,755,453 | 7/1956 | Cloutier | |
| 2,898,964 | 8/1959 | Masters | |
| 3,143,915 | 8/1964 | Tendler | |
| 4,017,142 | 4/1977 | Clark et al. | 339/17 R |

FOREIGN PATENT DOCUMENTS

| | | | |
|---|---|---|---|
| 252022 | 4/1964 | Australia . | |
| 166703 | 1/1906 | Fed. Rep. of Germany | 411/448 |
| 324650 | 9/1920 | Fed. Rep. of Germany . | |
| 811638 | 8/1951 | Fed. Rep. of Germany | 411/448 |
| 2262887 | 9/1973 | Fed. Rep. of Germany . | |
| 720390 | 12/1931 | France . | |
| 1278641 | 11/1961 | France . | |
| 38-11418 | 6/1963 | Japan . | |
| 13869 | 5/1971 | Japan . | |
| 51-147863 | 11/1976 | Japan . | |
| 161707 | 12/1976 | Japan . | |
| 125315 | 6/1949 | Sweden | 411/447 |
| 263364 | 11/1949 | Switzerland . | |
| 409543 | 5/1934 | United Kingdom . | |
| 428420 | 5/1935 | United Kingdom . | |
| 618911 | 3/1949 | United Kingdom . | |
| 855640 | 12/1960 | United Kingdom | 411/448 |
| 903146 | 8/1962 | United Kingdom . | |
| 1011199 | 11/1965 | United Kingdom . | |
| 1289819 | 9/1972 | United Kingdom . | |
| 1431479 | 4/1976 | United Kingdom | 339/220 R |

OTHER PUBLICATIONS

"Framsteg Inom Forskning och Teknik 1983" (Advances Within Research and Technique 1983), p. 20-Royal Swedish Academy of Engineering Sciences.

Primary Examiner—Thomas J. Holko
Attorney, Agent, or Firm—Fleit, Jacobson, Cohn & Price

[57] ABSTRACT

A rivet nail for forming a nailed joint to join parts together. The nail has a shank with a longitudinally-extending opening formed therein in the shape of a rhomb defined by two congruent triangles with an imaginary common base line. The widest portion of the opening is defined by the base line. The length of the opening is at least three times as long as the largest width of the shank, and the length of the shank between the end of the nail and the opening is at least one-fourth as long as the length of the opening.

9 Claims, 12 Drawing Figures

RIVET NAIL

This is a continuation of application Ser. No. 887,722 filed Mar. 17, 1978, and now abandoned.

FIELD OF THE INVENTION

This invention relates to an improved rivet nail for joining parts together. More particularly, the invention relates to such a rivet nail wherein a portion of the nail, which is located within the joined parts, is deformed to form a stronger nailed joint.

DESCRIPTION OF THE PRIOR ART

Joining parts together by nailing is well known. It is also known to join parts together by nailing in which the end of the nail is bent. Such nailing is usually done by riveting, i.e., by using a nail that is somewhat longer than the thickness of the parts to be joined together and by using a dolly to bend the nail end. In this way, a stronger nailed joint is achieved than by simple nailing with a nail shorter than the thickness of the joined parts, i.e., without bending the nail end. Nailing in which part of the nail is deformed to form a stronger joint is sometimes called pervading nailing.

With machine nailing, a known uniform nail having a pointed end and flat head is generally used. The nail is riveted on the pointed end that has penetrated the workpiece.

A significant disadvantage of riveting a nail in the previously known manner is the risk of cracking the riveted part when nailing natural wood, especially if the nailing is done across the fibre direction, as illustrated in FIG. 1. When riveting along the fibre direction, the nail does not always form the desirable 90° angle when bent or riveted. Sometimes, the nail end bends to form an acute angle with the surface of the wood. The nail end so angled presents a risk of damage to both people and material, as illustrated in FIG. 2. When riveting a hard material, such as wallboards and particle boards, it often occurs that the nail does not always bend as intended. Sometimes, the nail end is sheared by the riveting tool, which results in a bad joint, as illustrated in FIGS. 3a and 3b.

SUMMARY OF THE INVENTION

The present invention refers to an improved rivet nail which eliminates the disadvantages encountered with use of previously known rivet-type nails.

In accordance with the present invention, an improved rivet nail is provided for forming a strong nailed joint for joining parts together. The rivet nail has a head, a pointed end, and a shaft connecting the head to the end. A portion of the shaft close to the pointed end has a rhomb-shaped slit formed therein. The slit is formed in the shape of two congruent triangles with an imaginary common base line. The widest opening of the slit is in the region of the base line. The slit is at least three times as long as the width of the shank. The spacing between the bottom of the slit and the end of the nail is determined by the width of the materials to be joined and is preferably at least one-fourth the length of the slit.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which:

FIG. 4b illustrates an enlarged view of the circled portion of the rivet nail of FIG. 4a;

DESCRIPTION OF THE PREFERRED EMBODIMENT

Because rivet-type nails are known, the present description will be directed in particular to elements forming part of, or cooperating more directly with, the present invention. Elements not specifically shown or described herein are understood to be selectable from those known in the art.

Figure 1:
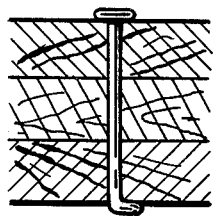
FIG. 1 illustrates a previously known nail riveted in natural wood across the fibres.
Figure 2:
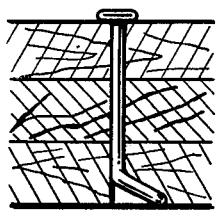
FIG. 2 illustrates a previously known nail riveted in natural wood along the fibres.
Figure 3A:
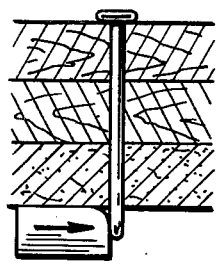
FIGS. 3a and 3b illustrate a previously known nail riveted over a hard board.
Figure 3B:
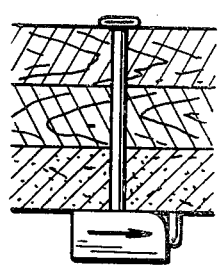
Figure 4A:
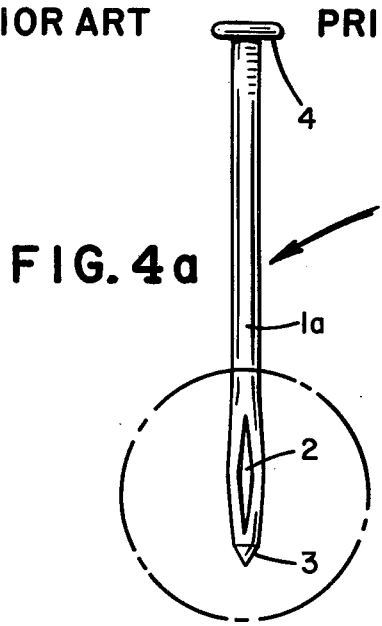
FIG. 4a illustrates a rivet nail according to the invention.
Figure 4B:
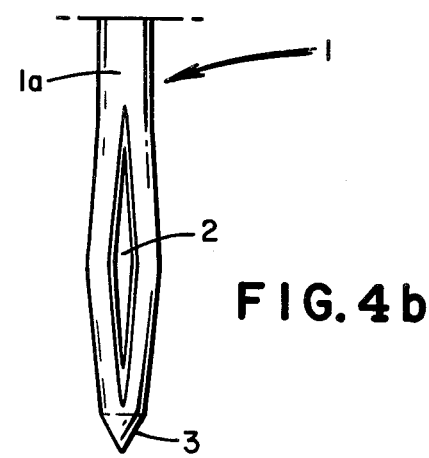

Turning now to the drawing and with specific reference to FIGS. 4a and 4b, one embodiment of a rivet nail according to the invention is illustrated. The rivet nail, which is generally designated 1, has a shank 1a with a longitudinally extending slit or opening formed in a lower portion. In a preferred embodiment, the slit has the form of a rhomb defined by two congruent triangles with a common imaginary base line. The widest opening of the slit is positioned along the imaginary base line, and the length of the slit is longer than the length of the unslitted nail end 3.

It will be readily apparent to those skilled in the art that the length of the shank 1a is determined by the width of the particular parts, pieces, or material to be joined by the rivet nail 1. Also, it will be readily apparent that the location and shape of the slit 2 will also be determined by the pieces to be joined. In one embodiment of the present invention, the length of the slit 2 is at least three times the largest width of the nail shank 1a, and the length of the unslitted nail end 3 is at least one-fourth as long as the length of the slit 2. This construction ensures that the nail end 3 is sufficiently rigid to penetrate the materials being joined and that the portions of the shank 1a surrounding the slit 2 are sufficiently weak as to be deformed by pressure applied to the nail end.

The distance from the head 4 of the rivet nail 1 to an upper part of the slit is preferably somewhat shorter than the thickness of the parts to be joined together. It is also preferable that the distance between the nail head 4 and the lower part of the slit 2 is not more than the thickness of the parts to be joined together.

Figure 5A:
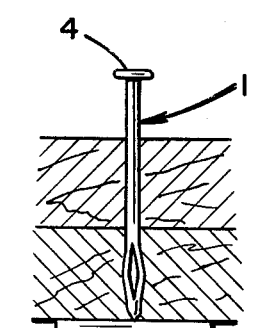
FIGS. 5a, 5b, 5c, and 5d illustrate the rivet nail of FIG. 4a in different phases during the driving in and riveting of the nail, when its end engages a firm steel cushion.
Figure 5B:
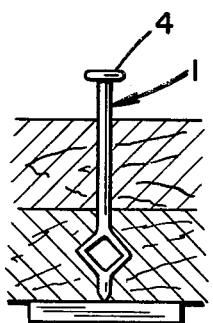
Figure 5C:
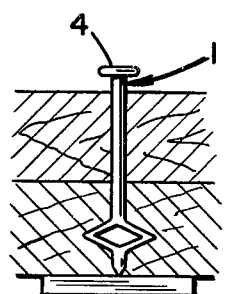
Figure 5D:
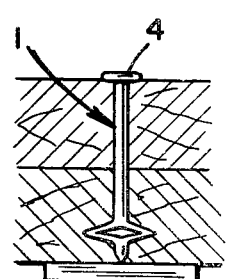

One advantage of a rivet nail with the shape of the present invention is in its use with machine nailing against a firm steel cushion 5. As illustrated in FIG. 5a, the rivet nail 1 is driven by an impact tool (not shown) through the material, parts or pieces to be joined until the nail end 3 contacts the steel cushion 5. Subsequent force exerted on the rivet nail 1, through the head 4, results in sequential deformation of the portion of the nail surrounding the slit 2, as illustrated in FIGS. 5b, 5c, and 5d. This deformation results in a stronger bond than that obtainable without deformation.

Figure 6A:
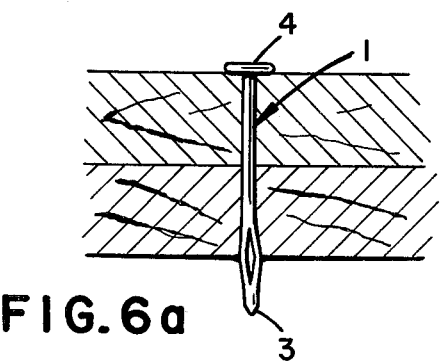
FIGS. 6a and 6b illustrate the rivet nail of FIG. 4a knocked through a workpiece and thereafter riveted.
Figure 6B:
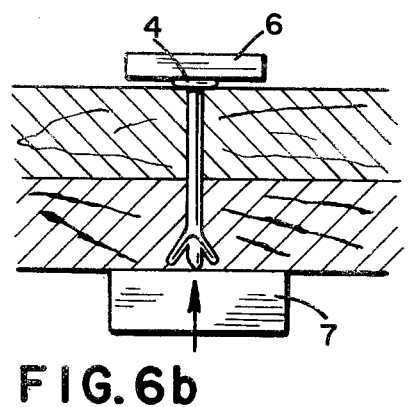

The rivet nail of the present invention is also very useful with hand-nailing. When so used, the whole nail is driven through the materials to be joined so that the end 3 protrudes as illustrated in FIG. 6a. A plate 6 is then positioned in contact with the head 4 to prevent upward movement of the rivet nail when a plate 7 is moved in the direction of the arrow in FIG. 6b to exert pressure on nail end 3. The pressure exerted by the plate 7 deforms the portions of the rivet nail 1 surrounding the slit 2. In this manner, a safe joint is obtained with the rivet-head plane along the surface of the wood, as illustrated in FIG. 6b.

As is readily apparent from the preceding description, use of the rivet nail of the present invention results in a safer joint than that possible with previously known rivet nails. This result is obtained because the deformed part of the rivet nail is located within the parts being joined. Thus, the risk of damage caused by projecting nail ends is sufficiently reduced.

The invention has been described in detail with particular reference to a preferred embodiment thereof, but it will be understood that variations and modifications can be effected within the spirit and scope of the invention.

I claim:

1. A rivet nail for forming a nail joint for joining parts together, said rivet nail comprising:
   a rivet portion of permanently deformable material terminating in a pointed end at one end of the rivet nail;
   a shank interconnecting said one end with the other end of the rivet nail; and
   said rivet portion forming an extension of the shank and terminating in said pointed end, said extension of said shank immediately adjacent said pointed end being parted into two outwardly bulging legs which are spaced apart at least at the place of maximum bulge with the legs reunited integrally each side of the bulging, the two outwardly bulging legs being totally located in a half portion of the rivet nail including the pointed end, the two outwardly bulging legs forming a slit having an axial length at least three times as long as the width of the shank, the distance from where said legs are reunited nearest said pointed end to said pointed end is at least one-fourth the length of said slit, said slit defining at opposite ends two straight sided congruent triangles with a common base portion therebetween, said pointed end being shaped to penetrate, when driving in the rivet nail, the parts being joined and the rivet portion adapted, when subjected to an axial compression force via backing means, to cause said bulging legs to deform outwardly into permanently deformed transversely extending anchoring portions for blocking axial movement of the rivet nail with respect to joined parts.

2. A rivet nail as claimed in claim 1, wherein the axial length of said shank is selected such that portions of said shank encompassing said slit are located within the joined parts upon deformation of said shank.

3. A nailed joint according to claim 1, wherein said deformed portion of said shank is positioned in the vicinity of an exterior surface of one of the joined parts.

4. A rivet nail for forming a nail joint for joining parts together, said rivet nail comprising:
   a headed nail portion at one end of the rivet nail and;
   a rivet portion of permanently deformable material terminating in a pointed end at the other end of the rivet nail;
   said headed nail portion comprising a nail head at said one end of the rivet nail and a shank for passing through and holding together parts to be joined extending from said nail head to join with said rivet portion at the other end of the rivet nail, and said rivet portion forming an extension of the shank and terminating in said pointed end, said extension of said shank immediately adjacent said pointed end being parted into two outwardly bulging legs which are spaced apart at least at the place of maximum bulge with the legs reunited integrally each side of the bulging, the two outwardly bulging legs being totally located in a half portion of the rivet nail including the pointed end, the two outwardly bulging legs forming a slit having an axial length at least three times as long as the width of the shank, the distance from where said legs are reunited nearest said pointed end to said pointed end is at least one-fourth the length of said slit, said slit defining at opposite ends two straight sided congruent triangles with common base portion therebetween, said pointed end being shaped to penetrate, when driving in the rivet nail, the parts being joined and the rivet portion adapted, when subjected to an axial compression force via backing means, to cause said bulging legs to deform outwardly into permanently deformed transversely extending anchoring portions for blocking axial movement of the rivet nail with respect to joined parts.

5. A rivet nail as claimed in claim 4, wherein the axial length of said shank is selected such that portions of said shank encompassing said slit are located within the joined parts upon deformation of said shank.

6. A nailed joint according to claim 4, wherein said deformed portion of said shank is positioned in the vicinity of an exterior surface of one of the joined parts.

7. A rivet nail for forming a nail joint for joining parts together, said rivet nail comprising:
   a headed nail portion at one end of the rivet nail and;
   a rivet portion of permanently deformable material terminating in a pointed end at the other end of the rivet nail;
   said headed nail portion comprising a nail head at said one end of the rivet nail and a shank for passing through and holding together parts to be joined extending from said nail head to join with said rivet portion at the other end of the rivet nail, and said rivet portion forming an extension of the shank and terminating in said pointed end, said extension of said shank immediately adjacent said pointed end being parted into two outwardly bulging legs which are spaced apart at least at the place of maximum bulge with the legs reunited integrally each side of the bulging, the two outwardly bulging legs being totally located in a half portion of the rivet nail including the pointed end, the two outwardly bulging legs forming a slit having an axial length at least three times as long as the width of the shank, the distance from where said legs are reunited nearest said pointed end to said pointed end is at least one-fourth the length of each slit, said slit defining at opposite ends two straight sided congruent triangles with a common base portion therebetween, said triangle sides at either side of the slit join said common base portion at an obtuse angle thereby forming a closely defined deformation zone at the middle portion of the bulged legs, said pointed end being shaped to penetrate, when driving in the rivet nail, the parts being joined, the end portions of the bulges closest to said pointed end being kept together by said pointed end during deformation of the rivet portion of the nail, and the rivet portion adapted, when subjected to an axial compression force via backing means, to cause said bulging legs to deform outwardly at said closely defined zone into permanently deformed transversely extending anchoring portions for blocking axial movement of the rivet nail with respect to joined parts.

8. A rivet nail as claimed in claim 7, wherein the axial length of said shank is selected such that portions of said shank encompassing said slit are located within the joined parts upon deformation of said shank.

9. A nailed joint according to claim 7, wherein said deformed portion of said shank is positioned in the vicinity of an exterior surface of one of the joined parts.

* * * * *